Nov. 30, 1926.  1,608,759
G. D. ANGLE
ENGINE CONSTRUCTION
Filed August 14, 1924
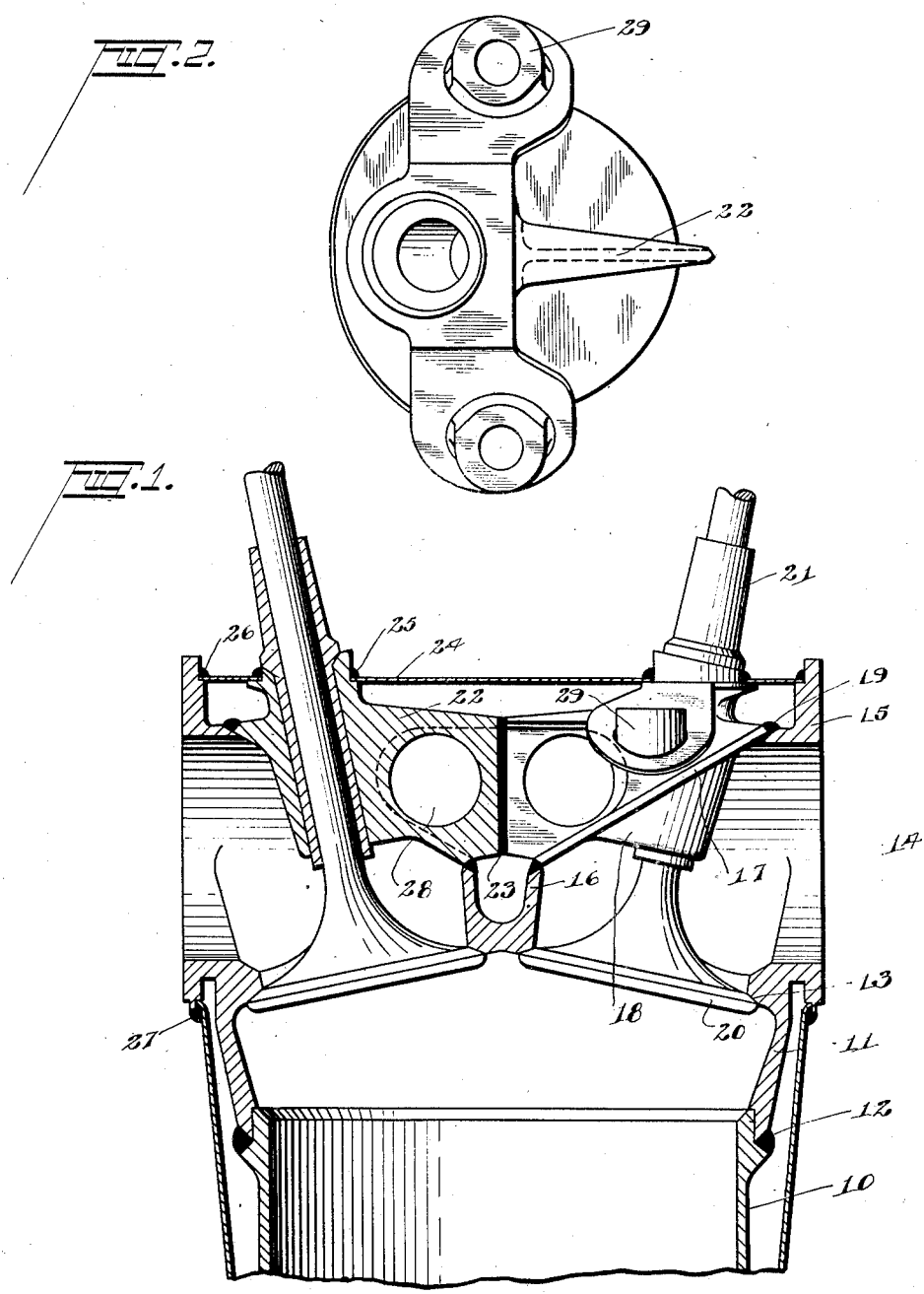
INVENTOR
Glenn D. Angle
BY
Robert H. Young
ATTORNEY Patented Nov. 30, 1926.

1,608,759

UNITED STATES PATENT OFFICE.

GLENN D. ANGLE, OF DETROIT, MICHIGAN.

ENGINE CONSTRUCTION.

Application filed August 14, 1924. Serial No. 732,077.

This invention relates to engine constructions generally and has more particular reference to improvements in the design and construction of engine cylinder heads.

In the past it has been found that the water jackets on the engine cylinders opened at the welded joints frequently, due to the vibration incident to the explosions in the engine cylinders. These failures appeared more frequently where the cylinder heads were not properly braced between the ports. The water jacket furnishes no resistance to the deflection of the cylinder head, nor does it sufficiently dampen the vibrations. According to the present invention, the members to which the jacket is welded or otherwise joined are interconnected so as to relieve the joints of the water jacket of any strain in the operation of the engine to avoid failures.

With the foregoing purposes in view, the invention provides a cylinder head construction wherein the valve guide bosses are mutually braced, the bosses being welded onto the head and being in turn welded to one another.

In the drawing illustrating the invention—

Fig. 1 is a vertical section through an engine cylinder head incorporating the improvements herein-above referred to.

Fig. 2 is an isolated plan view of one of the valve guide bosses.

The engine cylinder, the upper portion of which is shown at 10, has the head 11 fitted over the upper end thereof and welded as indicated at 12. The head 11 is preferably a one-piece forging, and has oppositely inclined valve seats 13 and opposed ports 14, the latter being provided with flanges 15, integral with the head or welded thereon. The head is machined to provide oppositely inclined flat faces 16 onto which the plates 17, forming an integral part of the valve guide bosses 18, are welded as indicated at 19. The valves 20 operate in bushings 21, which are usually driven into the bosses 18. The bushings 21 are machined on the same centers with the seats 13 after all of the welding operations on the head have been completed, and the head has been annealed to insure against any further warpage.

The valve guide bosses are trussed or braced one from the other by lugs 22 constituting extensions of the bosses 18. These lugs lie approximately in abutting relation when the valve guide bosses have been welded in their proper positions. The lugs are then butt-welded as indicated at 23, thus forming an integral rib or truss between the two bosses. This rib has been found to furnish ample bracing for the cylinder head to avoid excessive vibration that usually resulted in the failure at the joints of the water jacket. The water jacket 24 is welded at 25 to the valve guide bosses 18, and at 26 and 27 to the flanges 15 of the ports 14 of the head 11. The lugs 22 are formed with lightening holes as indicated at 28, which also avoids unnecessary obstructions to the flow of the cooling fluid in the water jacket. The rib formed by the welding together of the lugs 22 serves, to a certain extent, to transmit heat from about the valves to the cooling fluid. The ears 29 on the bosses 18 serve as supports for the cam shaft housing disposed between the valves 20 above the jacket 24.

It will be apparent from the foregoing description, that I have provided an improved engine cylinder head construction, in which all parts of the head are supported against deflection under load, and that the construction avoids the use of a heavy jacket or top plate for reinforcing the head. This latter type of construction involved the use of welded joints which were usually under considerable strain after cooling, or warped completely out of alignment, especially if not made of heavy wall section, or if not properly braced, in either of which events the weight involved was found to be prohibitive. The present construction, it will be observed, requires a minimum amount of welding so that warpage of the joints in cooling is reduced to a minimum. At the same time, no excessive weight is added in the bracing of the head and the bracing is accomplished in such a way that a very light jacket can be utilized, and there is no danger of failures at the jacket joints. An added advantage of the construction will be seen in the fact that the bracing structure is located where it serves to provide additional cooling surface.

I claim:

1. In an engine cylinder head construction, a pair of opposed valve guide bosses welded onto the head, said bosses having portions thereof welded together to mutually brace said bosses and reinforce said head.

2. In an engine cylinder head construction, a cylinder having a head joined thereto, with a water jacket surrounding said head, a pair of opposed valve guide bosses welded onto said head, and having said jacket welded thereto, lugs extending from said bosses into abutting relation within said jackets, welded together to brace said bosses and reinforce said head.

3. In an engine construction, a forged head over-lapping the end of the cylinder and welded thereto, said head having opposed valve ports provided with integral flanges, separate valve guide bosses welded onto said ports, lugs extending from said bosses welded together to provide reinforcing means for said head, and a jacket welded onto said port flanges.

4. In an engine construction, a separate head piece joined to the engine cylinder, valve seats and a pair of opposed valve ports provided in said head, said head being machined to provide oppositely inclined flat faces at said ports, a pair of separate valve guide bosses having plates welded onto said faces, and lugs on said bosses extending into approximate abutting relation, bridging the space between said bosses and welded together.

5. In a built up engine cylinder head construction, a head having opposed ports, separate valve guide bosses for said ports, and a relatively thin laterally extending integral extension on one of said bosses welded to the other of said bosses.

6. In a built up engine cylinder head construction, a head having opposed ports, separate valve guide bosses, welded to said ports, and lugs on said bosses extending into approximate abutting relation and welded together, thereby forming a rib serving as a truss member and for cooling the valves operating in said bosses.

7. In an engine cylinder head construction, a head member joined with the cylinder, valve seats and ports provided therein, separate valve guides joined with said head at said ports, and means connecting said guides serving to reinforce said head.

In testimony whereof I affix my signature.

GLENN D. ANGLE.